United States Patent [19]
Roth

[11] Patent Number: 5,907,839
[45] Date of Patent: May 25, 1999

[54] ALGORITHM FOR CONTEXT SENSITIVE SPELLING CORRECTION

[75] Inventor: Don Roth, Rehovot, Israel

[73] Assignee: Yeda Reseach and Development, Co., Ltd., Rehovot, Israel

[21] Appl. No.: 08/675,618

[22] Filed: Jul. 3, 1996

[51] Int. Cl.$^6$ .................................................. G06F 17/00
[52] U.S. Cl. ............................... 707/5; 707/530; 707/531
[58] Field of Search ....................... 707/1–206, 530–534; 704/1–10

[56] References Cited

U.S. PATENT DOCUMENTS

| | | | |
|---|---|---|---|
| 5,537,317 | 7/1996 | Schabes et al. | 704/9 |
| 5,576,955 | 11/1996 | Newbold et al. | 707/533 |
| 5,659,771 | 8/1997 | Golding | 707/533 |
| 5,671,426 | 9/1997 | Armstrong | 707/533 |

OTHER PUBLICATIONS www.merl.com/people/golding/index.html, Mar. 21, 1998.
www.merl.com/reports/TR95–13/index.html, Mar. 21, 1998.
www.merl.com/reports/TR96–03a/index.html, Mar. 21, 1998.
www.merl.com/reports/TR96–07/index.html, dated Apr. 1996, Mar. 21, 1998.
How to Use Expert Advice, Nicolo Cesa–Bianchi, et al., Universita di Milano(Italy), Nov. 25, 1992.
On–line Prediction and Conversion Strategies, N. Cesa–bianchi, et al., UCSC–CRL–94–28, Aug. 9, 1994.
A Method for Disambiguating Word Senses in a Large Corpus, William A. Gale, et al., AT&T Bell Laboratories.
A Bayesian hybrid method for context–sensitive spelling correction, Andrew R. Golding, Mitsubishi Electric Research Labs.
Concept Learning and the Problem of Small Disjuncts, Robert C. Holte, University of Ottawa, et al., Mar. 31, 1995.
Learning Quickly When Irrelevant Attributes Abound: A New Linear–threshold Algorithm, Nick Littlestone, University of California, 1988.
Kluwer Academic Publishers, Boston—Manufactured in The Netherlands, Revised: Dec. 29, 1987.
The Weighted Majority Algorithm, Nick Littlestone, et al., UCSC–CRL–91–28 Revised Oct. 26, 1992.
Context Based Spelling Correction, Eric Mays, et al., IBM Thomas J. Watson Research Center, Information Processing & Management vol. 27, No. 5, pp. 517–522, 1991.
Decision Lists for Lexical ambiguity Resolution; Application to Accent Restoration in Spanish and French, Davikd Yarowsky, University of Pennsylvania.

*Primary Examiner*—Wayne Amsbury
*Assistant Examiner*—David Yiuk Jung
*Attorney, Agent, or Firm*—Knobbe, Martens, Olson & Bear, LLP

[57] ABSTRACT

A method determining whether a target word used in a text is a correct word. The method being carried out in a data processor that is being configured according to a given operating system for reading data from, writing data to a storage medium and presenting data on a display screen. The method includes the steps of:

(a) identifying one or more features residing in the vicinity of the target word in a text. The features being associated with said target word in a database stored on said storage medium.

(b) using the features identified in step (a) to retrieve information from the database. The information being indicative as to the likelihood of said target word being in context with the features specified in step (a).

(c) using the information retrieved in step (b) as a criterion for indicating whether the target word is likely to be either the correct word or should it be replaced within said text.

24 Claims, 4 Drawing Sheets

ALGORITHM FOR CONTEXT SENSITIVE SPELLING CORRECTION

FIELD OF THE INVENTION

The present invention is in the general field of natural language processing which concerns evaluating the use of a word in the context of surrounding words for various applications such as context-sensitive text checking. Whilst, as will be evident from the description below, the system and method of the present invention are useful in many natural language oriented applications, for clarity of explanation the description below focuses primarily in the context-sensitive text checking application.

BACKGROUND OF THE INVENTION

Context-sensitive text correction is the task of fixing errors that result in valid words, such as This is not to difficult, where too was mistakenly typed as to. These errors account for anywhere from 25% to over 50% of observed errors (Karen Kukich, *Automatic spelling correction: Detection, correction and context-dependent techniques*, p. 38. Technical report, Bellcore, Morristown, N.J. 07960, November 1991, Draft.); yet they go undetected by conventional spell checkers, such as Unix spell, which only flag words that are not found in a word list. The challenge of this task (and related natural language tasks) for Machine Learning is to characterize the contexts in which a word cart (or cannot) occur in terms of features. The problem is that there is a multitude of features that one might use—features, that test for the presence of some particular word within some distance of the target word; features that test the pattern of parts of speech around the target word; and so on.

Context-sensitive text correction is taken here to be a task of word disambiguation. The ambiguity among words is modelled by confusion sets. A confusion set $C=\{w_1, \ldots w_n\}$ means that each word $w_i$ in the set is possibly ambiguous with each other word. Thus, if C={hear,here}, then when encountering either hear or here in a target document, it is assumed that any word that is a member in the confusion set (e.g. in the case under consideration hear or here) could possibly be the correct word. The task is to predict from the context of the surrounding features, preferably in high level of certainty, which word is actually correct. Generally speaking, confusion sets may encompass, for example, of words which resemble phonetically (e.g. cite, site, sight); words having textual resemblance, e.g. due to inadvertent typing mistake, such as exchange of letters, omission or addition of a letter (e.g. dessert vs. desert, or to vs. too). Confusion set may also encompass words which albeit being visually and phonetically distinguished tend to unduly replaced, e.g. among, between or amount, number etc. Accordingly, whenever referring to "spell checking" or "spell correction" the present invention likewise encompasses text correction. If desired, confusion sets may be customized to the specific application.

In the invention, for illustrative purposes only, confusion sets are confined to a list of "Words Commonly Confused" in the back of the Random House unabridged dictionary (Stuart Berg Flexner. editor. *Random House Unabridged Dictionary*. Random House, New York, (1983), Second edition).

There are known in the art techniques for context-sensitive text correction, including trigram-based methods [for detailed discussion see for example: E. Mays., F. J. Damerau, and R. L. Mercer. "Context based spelling correction", *Information Processing and Management*, 27 (5); 517–522, (1991)], Bayesian classifiers [Gale et al. 1993], decision lists [Yarowsky, 1994], and Bayesian hybrids (see Andrew R. Golding, ibid,). The last of these, (hereinafter Bayes), has been among the most successful, and is accordingly used herein as the benchmark for comparison with the context-sensitive text correction method and apparatus of the invention, Bayes has been described elsewhere (see Andrew R. Golding, ibid), and so will only be briefly reviewed here.

To disambiguate words $w_1$ through $w_n$, Bayes starts by learning features (learning features referred to also as "features mapping") that characterize the context in which each up tends to occur. It uses two types of features: context words and collocations. Context-word features test for the presence of a particular word within ±k words of the target word; collocations test for a pattern of up to l contiguous words and/or part-of-speech tags around the target word. Each word in the sentence is tagged with its set of possible part-of-speech tags (i.e. verb, noun, etc.), obtained from a dictionary. Thus, for example, the word laugh may stand for a verb or a noun (i.e. two distinct part of speeches), depending on the particular use in the sentence. If there is no a priori knowledge on the identity of the part of speech in an examined sentence that includes the word laugh, the latter is inserted to the database, along with its pertinent features, under two separate entries signifying noun and verb respectively.

Thus, for example, for k=10 and l=2, the features For the confusion set {weather,whether}, include:

(1) cloudy within ±10 words (2) _____ to VERB where (1) is a context-word feature that tends to imply weather, and (2) is a collocation that checks for the pattern "to VERB" immediately after the target word, and tends to imply whether. (as in I don't know whether to laugh or cry).

Bayes learns these features from a training corpus of correct text. Each time a word in the confusion set occurs, Bayes proposes every feature that matches that context (one context-word feature for every distinct word within ±k words, and one collocation for every way of expressing a pattern of up to l contiguous elements). After working through the whole training corpus, Bayes tallies the number of times each feature was proposed. It then prunes features for two reasons: (1) the feature occurred in practically none or all or the training instances (specifically, it had fewer than 10 occurrences or fewer than 10 non-occurrences); or (2) the presence of the feature is not significantly correlated with the identity of the target word (determined by a chi-squared test at the 0.05 significance level).

The set of learned features is used at run time to classify an occurrence of a word in the confusion set. All the features are compared against the target occurrence.

Whilst Bayes, and other statistic bases approaches, purports to cope with the problem of context-sensitive text correction, they have not been matured to a commercially available product, due to their limited performance in terms of the success rate in revealing context-sensitive mistakes in a document and in offering appropriate substitute for revealed mistakes.

As will be explained in greater detail below, various embodiment of the present invention exploit some known per se techniques. Thus, apart from the above "features mapping" techniques, there is also used, in various embodiments of the invention a so called linear separation techniques which receives as an input a description of line in the form of:

$$\sum_{i=0}^{n} x_i \cdot w_i$$

where $x_i$ represents a given feature ($x_i=1$ signifies that the feature is active; $x_i=0$ signifies that the feature is non-active), and $w_i$ represents a positive weight. For a given input features ($x_1, x_2, \ldots x_n$) the algorithm predicts a value "1" if and only if (iff):

$$\sum_{i=0}^{i=n} x_i \cdot w_i > \theta$$

and "0" otherwise, where $\theta$ indicates a predetermined threshold. The linear separator algorithm separates, thus, between the various input instances as belonging to a first category, having a value "1", or to a second category having a value "0". By one, non limiting, embodiment of the present invention the known Winnow linear separation algorithm is utilized.

A detailed discussion of the Winnow algorithm is found in [N. Littlestone. Learning quickly when irrelevant attributes abound: A new linear-threshold algorithm. Machine Learning, 2:285–318, 1988.], and accordingly there follows only a brief description thereof.

Generally speaking, Winnow has three parameters: a threshold $\theta$, and two update parameters, a promotion factor $\alpha>1$ and a demotion parameter $0<\beta<1$. For a given instance ($x_1, \ldots, x_n$) the algorithm predicts 1 iff $$\sum_{i=1}^{n} w_i x_i > \theta,$$

where $w_i$ is the weight on the edge connecting $x_1$ to the target node. Thus the hypothesis of this algorithm is a linear threshold function of $\{0,1\}^n$. The algorithm updates its hypothesis only when a mistake is made. If the algorithm predicts 0 and the received label is 1 (positive example) then for all indices i such that $x_i=1$, the weight $w_i$ is replaced by a larger weight $\alpha \cdot w_i$. If the algorithm predicts 1 and the received label is 0 (negative example) then for all indices i such that $x_i=1$, the weight $w_i$ is replaced by a smaller weight $B \cdot w_i$. In both case, if $x_i=0$, its weight remains unchanged.

Winnow is a mistake-driven algorithm; that is, it updates its hypothesis only when a mistake is made. Intuitively, this makes the algorithm more sensitive to the relationships among the attributes that may go unnoticed by an algorithm that is based on counts accumulated separately for each attribute.

The system and method of the invention utilizes, in various embodiment thereof, a so called "weighted majority algorithm". A detailed discussion of this algorithm is given below.

It is accordingly the object of the present invention to provide for a novel system and method for evaluating the use of a word in the context of surrounding words within a text.

It is another object of the invention to provide a database stored on a storage medium, for use in applications for evaluating the use of a word in the context of surrounding words within a text.

It is a specific object of the invention to provide for novel method and system for context sensitive text checking.

SUMMARY OF THE INVENTION

For clarity, the hereinbelow description in the "summary of the invention" section refers to various prior art publications which present concepts that are partly or entirely used in various embodiments of the present invention. It should be nevertheless noted that the scope of the present invention is, by no means, limited by the use of these concepts with respect to both the general concepts and the particular application thereof in various embodiments of the invention.

The approach for context-sensitive text correction of the invention is influenced by the Neuroidal system suggested in [L. G. Valiant. *Circuits of the Mind*. Oxford University Press, November 1994.]. The Neuroidal system consists of a very large number of items, e.g. in the range of $10^5$. These correspond to so-called high-level concepts, for which humans have words, as well as to lower-level predicates from which higher-level ones are composed. The knowledge representation is a large network of threshold gates, in which every concept (target word) is defined as a function of plurality of features.

Optionally, every concept is represented as a cloud of nodes (i.e. target word members) in the network. While each member in this cloud learns its dependence on other features in the network autonomously, all the cloud's members take part in any decision with respect to the concept. Each interaction with the world, e.g., reading a sentence of text, is viewed as a positive example of a few of these items and a negative example for all the others. Each example is used once by all the items to learn and refine their definition in terms of the others [Rationality, ibid.; The non-monotonic case, ibid.], and is then discarded. Local learning algorithms are used at each node: a variant of Littlestones' Winnow algorithm [N. Littlestone. Learning quickly when irrelevant attributes abound: ibid] is used by each cloud member to learn its dependence on the features, but different members of a target word cloud run this algorithm with different parameters. A decision with respect to the concept represented by the cloud is reached via a variant of the Weighted Majority algorithm [Littlestone and Warmuth, 1994].

For the purpose of applying the concepts described above to various embodiments of the invention, every word (target word) which appears in a text (training corpus text and/or target text) is represented as a node. Links from the target word are added only to those features that happen to be active in the same sentence. During training phase, when encountering an example for a confusion set, e.g. {desert, dessert}, the active features in the example are triggered. Then, an update stage occurs, in which each member of the desert and desert clouds updates its representation as a function of the active features. For the sake of this update, if the sentence includes the word desert, then the example is viewed as a positive example for the desert members and a negative example for the desert members. During operational phase essentially the same process is done, except that the predication is done at the concept (cloud) level. We predict desert if the total weighted activation of the members of this cloud outweighs that of dessert.

There is thus provided in accordance with the invention a database which stores information for allowing a computer program to evaluate the usage of a target word within the context of surrounding words in a target text, the database comprising;

a computer-readable medium;

a database structure stored on the computer-readable medium, the database structure including:

(i) a plurality of target words;

(ii) a plurality of features and associated weight values stored with respect to each one of said plurality of target words;

the plurality of features reside in the vicinity of said one target word in a training text corpus;

the plurality of weight values indicating a contextual relationship at least between the target word and the plurality of features.

The invention further provides for a method for determining whether a target word used in a text is a correct word, the method being carried out in a data processor, the data processor being configured according to a given operating system for reading data from, writing data to a storage medium and presenting data on a display screen, the method comprising the steps of:

(a) identifying at least one feature residing in the vicinity of said target word in a text; said at least one feature being associated with said target word in a database stored on said storage medium;

(b) using the at least one feature identified in step (a) to acquire information from the database, the information being indicative as to the likelihood of said target word being in context with the at least one feature;

(c) using the information retrieved in step (b) as a criterion for predicting whether the target word is likely to be either the correct word or should it be replaced within said text and in the latter case, altering the information in said database.

The latter steps are normally executed in a so called training phase during which a training text corpus is reviewed and the specified database is built up. Accordingly, when encountering, for the first time, a feature at the vicinity of a target word, an association between the feature and the target word is generated. In the case that the feature was encountered before, such an association already exists. The acquisition of information as specified in step (b), included retrieval of information in the case it is available, or inserting (and retrieving) information (topically predetermined arbitrary information) if it is not available as in the case when a feature is encountered for the first time.

The information that reside in the database may undergo update as stipulated in step (c).

The invention further provides for a method for determining whether a target word used in a text is a correct word, the method being carried out in a data processor, the data processor being configured according to a given operating system for reading data from, writing data to a storage medium and presenting data on a display screen, the method comprising the steps of:

(a) identifying at least one feature residing in the vicinity of said target word in a text; said at least one feature being associated with said target word in a database stored on said storage medium;

(b) using the at least one feature identified in step (a) to retrieve information from the database, the information being indicative as to the likelihood of said target word being in context with the at least one feature; and (c) using the information retrieved in step (b) as a criterion for indicating whether the target word is likely to be either the correct word or should it be replaced within said text.

The latter steps are normally executed during operational phase wherein a target text is examined. Although not typical, the information in the database may be updated also in the operational phase.

By one embodiment, the invention provides for methods of the kind specified wherein the target word belongs to a confusion set that includes at least one additional candidate word; and wherein the information stipulated in step (b) being indicative also as to the likelihood of at least one of said candidate words being in context with the at least one feature; and wherein said step (c) is replaced by the following step (c')

(c') using the information retrieved in step (b) as a criterion for determining whether the target word should be either replaced within said text or replaced within said text by one of said candidate words.

Preferably, the information stipulated in step (b) includes at least one weight value associated with the at least one feature, respectively;

the plurality of weight values indicating a contextual relationship at least between the target word and the plurality of features.

By another aspect, the invention provides for a processor being configured according to a given operating system for reading data from, writing data to a storage medium and displaying data on a display screen; the processor comprising means configured to access a database, of the kind specified, being stored on said storage medium for performing context related text checking.

BRIEF DESCRIPTION OF THE DRAWINGS

For a better understanding, the invention will now be described, by way of example only with reference to the accompanying drawings, in which.

GENERAL DESCRIPTION OF THE INVENTION

Figure 1:
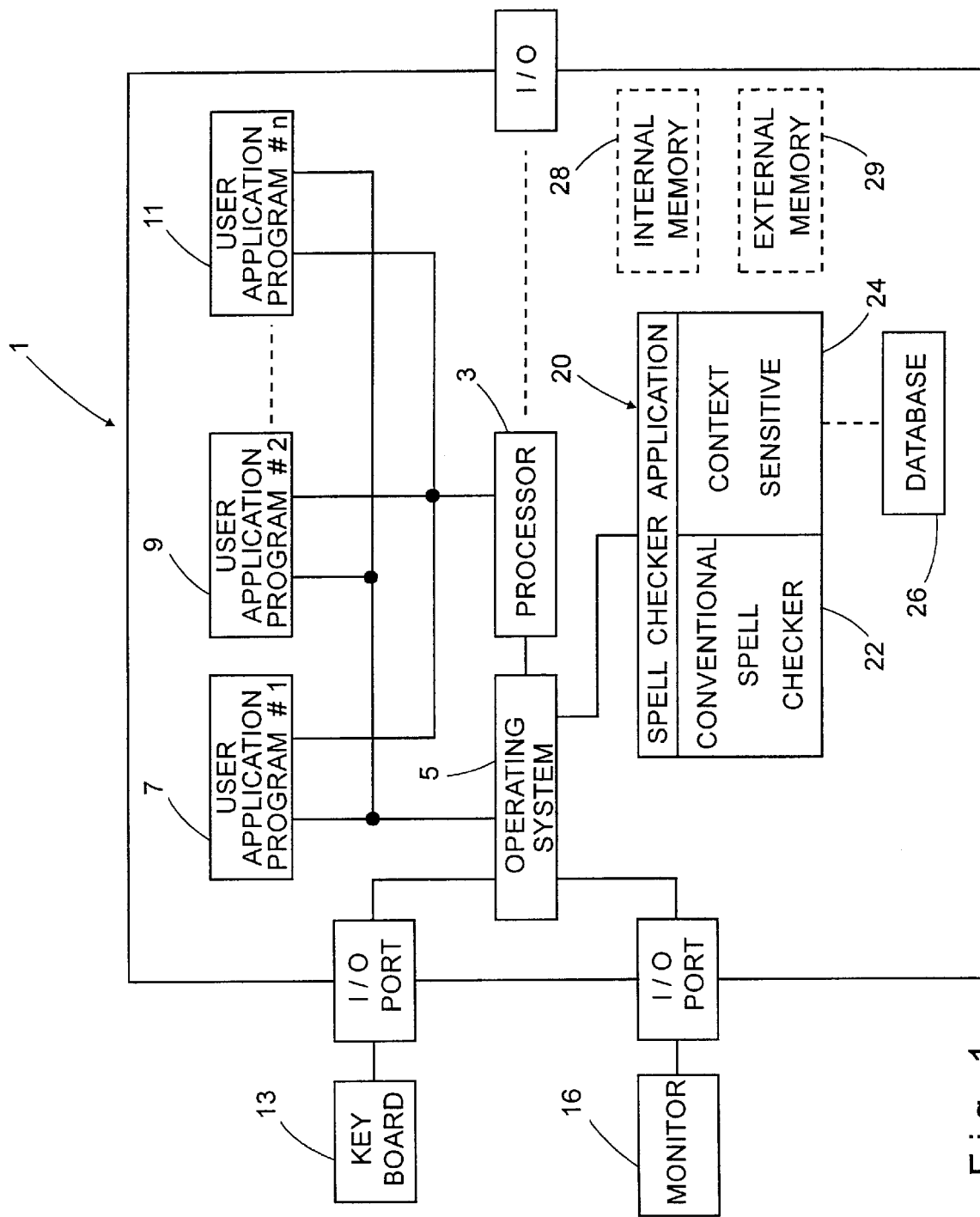
FIG. 1 is a generalized block diagram of a system according to the invention.

For simplicity, the following description focuses on a context sensitive text correction application Those versed in the art will readily understand that the invention is likewise useful for various other applications which concern evaluating the use of a word within the context of surrounding words, such as text categorization and others.

Attention is first directed to FIG. I showing a generalized block diagram of a system according to the invention. Thus, a general purpose computer 1, e.g. a personal computer (P.C.) employing a Pentium® microprocessor 3 commercially available from Intel Corp. U.S.A, has an operating system module 5, e.g. Windows NT® commercially available from Microsoft Inc. U.S.A., which communicates with processor 3 and controls the overall operation of computer 1.

P.C. 1 further accommodates a plurality of user application programs of which only three 7, 9 and 11, respectively are shown. The user application programs are executed by processor 3 under the control of operating system 5, in a known per se manner, and are responsive to user input fed through keyboard 13 by the intermediary of I/O port 15 and the operating system 5. The user application programs further communicate with monitor 16 for displaying data, by the intermediary of I/O port 17 and operating system 5. A user application program of the kind specified, e.g. the known "word" word processor, is normally used for editing documents of various types. The user who uses the word processor normally executes a built-in spell checker utility for fixing spelling errors in the document. According to the invention, there is preferably utilized an enhanced text checker tool 20 (shown, for clarity, as a separate tool but which may, likewise, be a built-in tool incorporated into a conventional word processor). The enhanced text checker includes, preferably but not necessarily, conventional, known per se, spell checker module 22 and a context sensitive text checker module 24 capable of communicating with a pertinent database module 26. Obviously, albeit not shown in FIG. 1, the spell checker 22 may interact with other utilities such as synonym and thesaurus modules (not shown).

FIG. 1 further shows schematically a internal memory module 28 (e.g. 16 mega byte and possibly employing a cache memory sub-module) and an external memory module 29 (e.g. 1 gigabyte). Typically, external memory 29 is accessed through an external, relatively slow communication bus (not shown), whereas the internal memory is normally accessed by means of a faster internal bus (not shown).

It should be noted that for simplicity of presentation, the internal and external memory modules 28, 29, are separated from the various modules 5, 7, 9, 11, 20. Clearly, albeit not shown, the various modules (operating system, spell checker application, and user application programs) are normally stored on a storage medium such as an external memory and their currently executed portions are loaded to the internal memory.

Computer 1 may serve as-a work station forming part of a LAN Local Area Network (LAN) (not shown) which employs a server having also essentially the same structure of FIG. 1. To the extent that the work stations and the server employ client-server based protocols a predominant portion of said modules reside in the server.

Those versed in the art will readily appreciate that the foregoing embodiments described with reference to of FIG. 1 are only two out of many possible variants. It should be further noted that for clarity of explanation system 1 is illustrated in a simplified and generalized manner. A more detailed discussion of the various known per se components including the processor, operating system and conventional spell checker can be found in a pertinent. manufacturer documentation.

Figure 2:
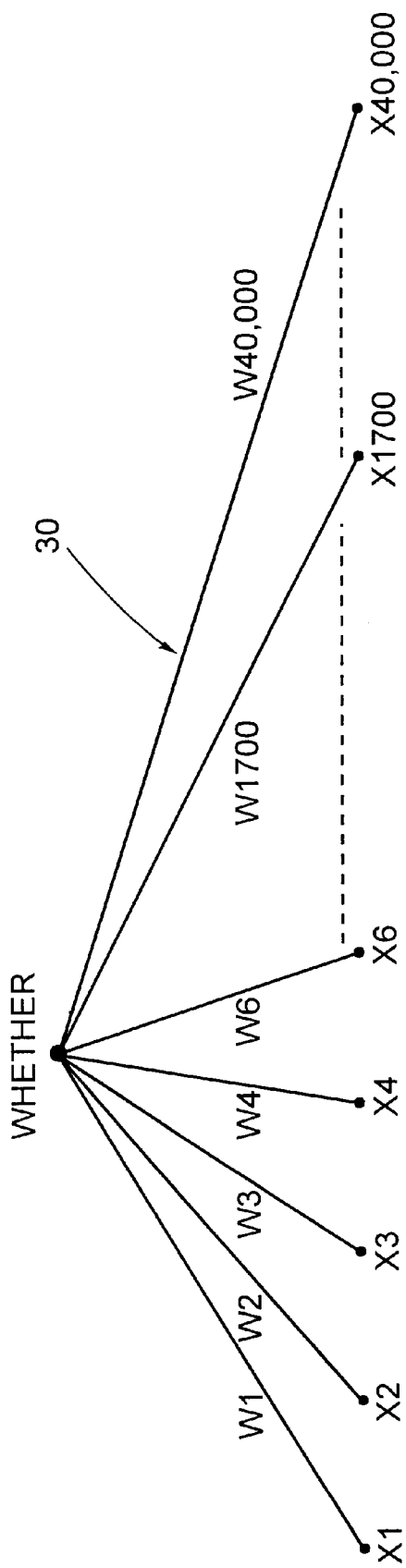
FIG. 2 is a schematic representation of an entry in a database according to a preferred embodiment of the invention.
Figure 3:
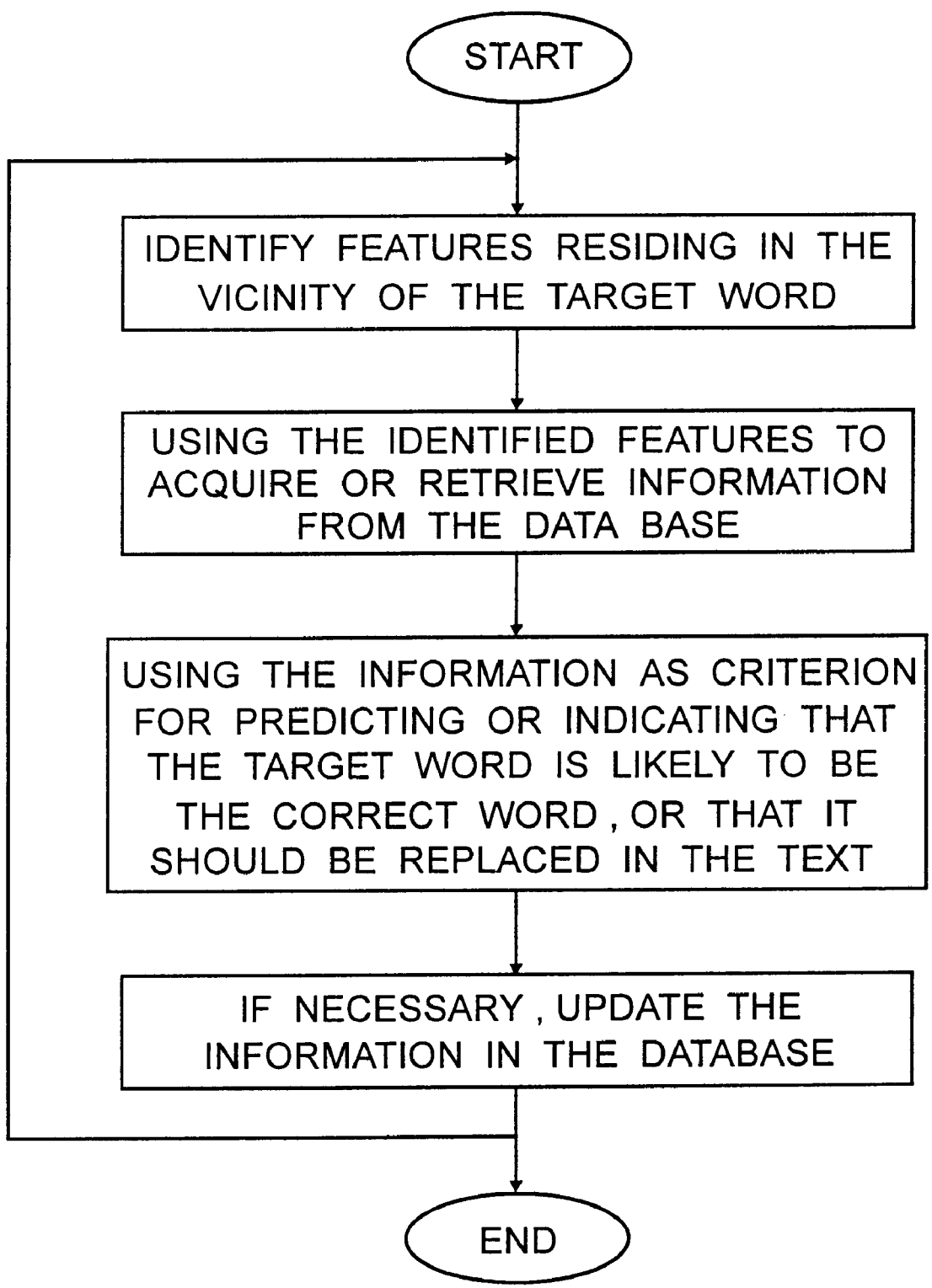
FIG. 3 is a generalized block diagram illustrating the operation of one embodiment of the invention.

Having described the general structure of a system of the invention, attention is now directed to FIG. 2 showing a schematic representation of a single entry "WHETHER" (30)—referred to also as target word-in a database according to a preferred embodiment of the invention. By way of example only, the database under consideration includes a feature set which encompasses 40,000 features (designated $X_1$ to $X_{40,000}$). Attention is also directed to FIG. 3 which is a generalized block diagram illustrating the operation of one embodiment of the invention.

During training and/or operational phase the features that reside in the vicinity of a target word are extracted from the text and are utilized to evaluate the use of the target word.

The features that are extracted from the text may be for example:

(i) words within ±k words of the target word. This type of feature is normally designated as word feature; and (ii) patterns of up to l, preferably but not necessarily, continuous items (items stand for words, syntax structure or part-of-speech tags etc.) which reside in the vicinity of the target word. This type of feature is normally designated as collocation feature.

Consider, for example, the sentence:

(1) "I don't know WHETHER to laugh or cry.", wherein "whether" is the target word.

For k=2 any of the underlined words is deemed a word feature and thus the words "don't", "know", "to" and "laugh" are marked as $X_1$, $X_2$, $X_3$ and $X_4$, respectively. The following syntax structures (or part of speech tags) are also deemed features: "WHETHER to verb" ($X_5$), and "verb WHETHER to" ($X_6$).

The construction of features in the manner specified is known in the literature and the volume as well as the categories that constitute the feature set may vary, depending upon the particular application. In the example of FIG. 2, there are 40,000 features designated as $X_1$ to $X_{40,000}$.

The term vicinity is not intended to indicate specific level of proximity to the target word and it may be determined in accordance with the particular application, e.g. features of interest may be only those that reside in the same sentence as the target word, or in the same paragraph, or at a distance of ±k words from the target word, etc.

The database of the target words, is normally built-up in also called training phase during which a training text corpus, which is assumed to be prima facie correct, is scanned and any occurrence of the target word in the corpus may result in a database update procedure. If a feature is encountered in the corpus for the first time (with respect to a given target word) the latter is linked to the encountered feature and the link is a signed with a default weight (e.g. 0.5). When additional occurrences of said feature are encountered while scanning the corpus of reference text, the weight of the link of the given feature in a manner described below.

Intuitively, after scanning large enough reference text, the plurality of weight values that are linked to a like number of plurality of features indicate contextual relationship between the target word and the plurality of features and contextual relationship among the plurality of features themselves. It should be nevertheless noted that at a given interim training stage or even operational stage, the latter assertion does not necessarily hold. Thus, by way of example, a feature which is normally associated with the target word may nevertheless be assigned with a relatively low weight. The "strength" of the proposed approach is that the context sensitive text correction method and system has a learning capability which inherently improves the performance by duly updating the weights so as to obtain a better performance as compared to conventional techniques in terms of the likelihood of revealing context related mistakes and possibly offering an appropriate substitute therefor.

Reverting now to FIG. 2, the shown entry is of the word "whether" linked to the features $X_1$, $X_2$, $X_3$, $X_4$, $X_6$, $X_{1760}$ and $X_{40,000}$, with respective weights $W_1$, $W_2$, $W_3$, $W_4$, $W_6$, $W_{1760}$ and $W_{40,000}$. The structure of FIG. 2 implies that during the training phase (and possibly also operation phase) the features $X_1$, $X_2$, $X_3$, $X_4$, $X_6$, $X_{1760}$ and $X_{40,000}$ were encountered at least once. FIG. 2 illustrates the result of the training (and possible operational) phases which have occurred up till now and which built-up the database in an incremental manner. Thus, for example, in a given text, the target word appears along with features $X_1$, $X_3$ and $X_{40,000}$, in a different text it appears with $X_1$, $X_2$, $X_{1760}$ and in another text it appears along with features $X_2$, $X_3$, $X_4$, $X_6$, $X_{1760}$; accordingly, the features $X_4$, $X_6$ and $X_{40,000}$ were encountered only once, the features $X_1$, $X_2$, $X_3$ and $X_{1760}$ were encountered twice. The procedure of updating the weights will be described in greater detail below. Database entries of the kind illustrated in FIG. 2, are normally built up for members of the confusion sets and possibly for other words. Accordingly, the database of FIG. 2 includes a mating entry for the target word weather. The target word in the database may be viewed as a function of other features in the following manner:

$$\sum_{i=0}^{n} x_i \cdot w_i$$

wherein $w_i$'s represents contextual relationship between the $x_i$'s and the target word.

Consider for example a confusion set $\{W_1, W_2\}$, i.e. consisting of the words $W_1, W_2$. Given a sentence that includes the word $W_1$, it is first translated into a list of active features. The example is used as a positive example for $W_1$ word and a negative example for the $W_2$ word.

For a better understanding, the procedure of building the database during training phase as well as the utilization thereof during operational phase will now be described with reference to an example sentence. It is recalled that the hereinbelow analysis is not necessarily bound to a particular section of a document and accordingly valid features can be extracted e.g. from a sentence which follows the one that includes the target word. By this particular example the aforementioned Winnow linear separation algorithm is utilized, the confusion set under consideration is {WHETHER, WEATHER}, and features are extracted only from the sentence that include the target word.

The set of features that are associated with a given target word in the sentence are referred to as a list of active features. It should be further noted that, preferably, for a given confusion set which encompasses the target word the specified sentence is deemed a so called "positive example" for the target word and as a negative example for the remaining words in the confusion set. This is, of course, only one out of many possible variants e.g. the example may serve as a negative example to only some of the remaining words in the confusion set and others, all as required and appropriate depending upon the particular application.

Turning now to the example, it reads as follows:

(2) "I don't know WHETHER it's sunny today", wherein the target word is WHETHER.

The active features are:

1) words (for k=2): $X_1$=don't; $X_{12}$=know; $X_7$=it's; $X_5$=sunny;

2) part of speech elements: $X_9$=know ___ ; $X_2$=Verb ___ ;

and possibly others.

The active features for sentence (2) may thus be viewed in vectoric representation as (1, 2, 5, 7, 9, 12 . . . WHETHER).

Sentence (2) is considered a positive example for the word "WHETHER" and as a negative example for the word "WEATHER".

Assuming, for example, that the current set of weights that correspond to the features of the word WHETHER in the database is: $\{(0.1 (X_1), 0.7 X_2), 0.15 (X_3), 0.9 (X_4), 0.02 (X_5), 0.3 (X_6), 0.03 (X_7), 0.005 (X_9), 0.7 (X_{11}), 0.01 (X_{12}), 0.35 (X_{17}), 0.22 (X_{25}), 0.17 (X_{37}), 0.07 (X_{56}), 0.28 (X_{106})\}$. Note that the part of speech clement "Verb ___" which normally appears in connection with the word WHETHER (and therefore contextually related thereto) is associated with a, relatively large weight (0.7) whereas the word "sunny" (which intuitively is more related to WEATHER and therefore is likely to have a larger weight in relation thereto) has a low weight. The word "sunny", although having a low weight value, is by this particular example correctly used in connection with WHETHER and it would have been a mistake to reach a conclusion as regards the usage of WHETHER if "sunny" were the only word serving, as criterion to this end. Accordingly, the decision as regards the usage of the word WHETHER is taken on the basis of all the active features, each one according to its respective weight. As mentioned in the foregoing, one could therefore intuitively regard the plurality of weights as a criterion for determining the contextual relationship between the target word and the plurality of features rather than evaluating each feature and its associated weight per se.

Reverting now to in the above example, it is readily seen that only the features 1, 2, 3, 4, 5, 6, 7, 9, 11, 12, 17, 25, 37, 56 and 106 have ever been encountered before. Accordingly, if the entire set of features accounts for 40,000, this means that most of them have not, as yet, been encountered in connection with the target word WHETHER, which implies that they are not contextually related to the target word under consideration (provided, of course, that the situation remains unchanged). Sentence (2) consists of the active features 1, 2, 5, 7, 9, and 12 having the respective weights 0.1, 0.7, 0.02, 0.03, 0.005, 0.01 (hereinafter current weights). Next, it should be determined whether the current weights are in agreement with the specified positive example. According to Winnow, the line defined by the current weights should exceed a predetermined threshold θ (which, in this example, is arbitrarily selected to have the value 1).

Applying the latter Winnow step to the example under consideration results in: 0.1+0.7+0.02+0.03+0.005+0.01= 0.91, which is obviously smaller than the threshold.

This being the case, the weights have to be updated, and by this specific example, Winnow dictates that all the pertinent weight be increased by the same factor, e.g. 2, put differently the "promotion factor" is 2.

Thus, the new weights of features 1, 2, 5, 7, 9 and 12 being 0.2, 1.4, 0.04, 0.06, 0.01, 0.02. If in the latter example the sum of the weight were exceeding 1, no change in weight would have been required.

Likewise, considering the word WEATHER (for which the above sentence serve as a negative example) if the sum is smaller than 1 no change in the weights is required, whereas in the case that for this negative example the sum is larger than 1, the weights have to be updated, but this time their value is decreased rather than increased, or in other words the weights are reduced by a demotion factor.

One could therefore regard a target word of the kind specified, in the database as a learning node, i.e. it improves as it encounters larger volumes of text that includes, of course, the target word, Typically, a target word is associated with a promotion and/or demotion parameter which dictates how to update the weights should a negative example is mistakenly deemed as a positive (resulting in applying the demotion factor(s) to the weights), or a positive example is mistakenly deemed a negative one which results in applying the promotion factor(s) to the weights. It should be noted that a target word may be associated with one or more promotion factor and/or one or more demotion factor.

The distinction between training and operational phase is somewhat vague simply since the operation of the method of the invention is essentially the same for both phases, except for the fact that the training phase inherently includes weight update step, whereas the latter is only optional for the operational phase. It should be noted that, the larger the training text corpus the better is the likelihood that the method of the invention would succeed, during operational phase in revealing context related mistakes in a user's document and offer a correct amendment therefor. Obviously during operational phase the user is prompted on indication that a target word is likely to be incorrect whereas such indication is not necessarily included during training phase.

According to an embodiment of the invention, every concept (a member of a confusion set) is represented as a cloud of members. While each member in this cloud is running Winnow and learns its dependence on other members in the cloud autonomously, all the cloud's members take part in any decision with respect to the target word concept. In other words the indication whether the target word is correct or not is taken on the basis of the decisions of all local experts. In prediction, each member of the cloud can be viewed as an expert. The global algorithm uses the expert's activation level to make a prediction. By one specific embodiment, different members of the cloud run the Winnow variant described above, each with a distinct demotion parameter, promotion parameter, or both. The intuition is that different words in the same confusion set may overlap to various degrees, and should be penalized accordingly for a mistaken prediction. For example, in the case of {among, between}, there is a considerable overlap in the usage of the words, and therefore, a sentence in which the word among appears is a negative example for between only with some small probability. On the other hand, {weather, whether} have disjoint usages, and every occurrence of weather is, effectively, a negative example of whether with certainty. Thus, following a mistake, in the former case we want to demote the weights by a smaller ratio than in the latter. Running Winnow with various demotion parameters in parallel allows the algorithm to select by itself the best setting of parameters for each target word.

The question of combining the predictions of experts in a way that minimizes the total number of mistakes has been studied extensively, e.g., in [N. Littlestone and M. K. Warmuth. The weighted-majority algorithm. *Information and Computation*, 108(2):212–261, 1994; N. Cesa-Bianchi, Y. Freund, D. P. Helmbold, D. Haussler, R. E. Schapire, and M. K. Warmuth. How to use expert advice. In *ACM Symp. on the Theory of Computing*, pages 382–291, 1995; N. Case-Bianchi, Y. Freund, D. P. Helmbold, and M. Warmuth. On-line prediction and conversion strategies. In *Computational Learning Theory: Eurocolt '39*, pages 205–216, Oxford, 1994. Oxford University Press.]. The general approach is to assign to each expert a weight (hereinafter a second weight) of the form $\gamma^m$, where $0<\gamma<1$ is a constant and m is the total number of mistakes incurred by the expert so far. The essential property is that the weight of experts making many mistakes rapidly disappears. By a specific, non limiting case, a variant of the above mentioned weighted majority scheme is utilized in which $\gamma$ is initially set to 1 and decreases its value with the number of examples seen, to avoid weighing mistakes of the initial hypotheses too heavily.

The member in a confusion set having the highest weighted sum is selected to be the correct word. (calculated by summing the weighted results of the distinct cloud members that pertains to this confusion set's member).

Figure 4:
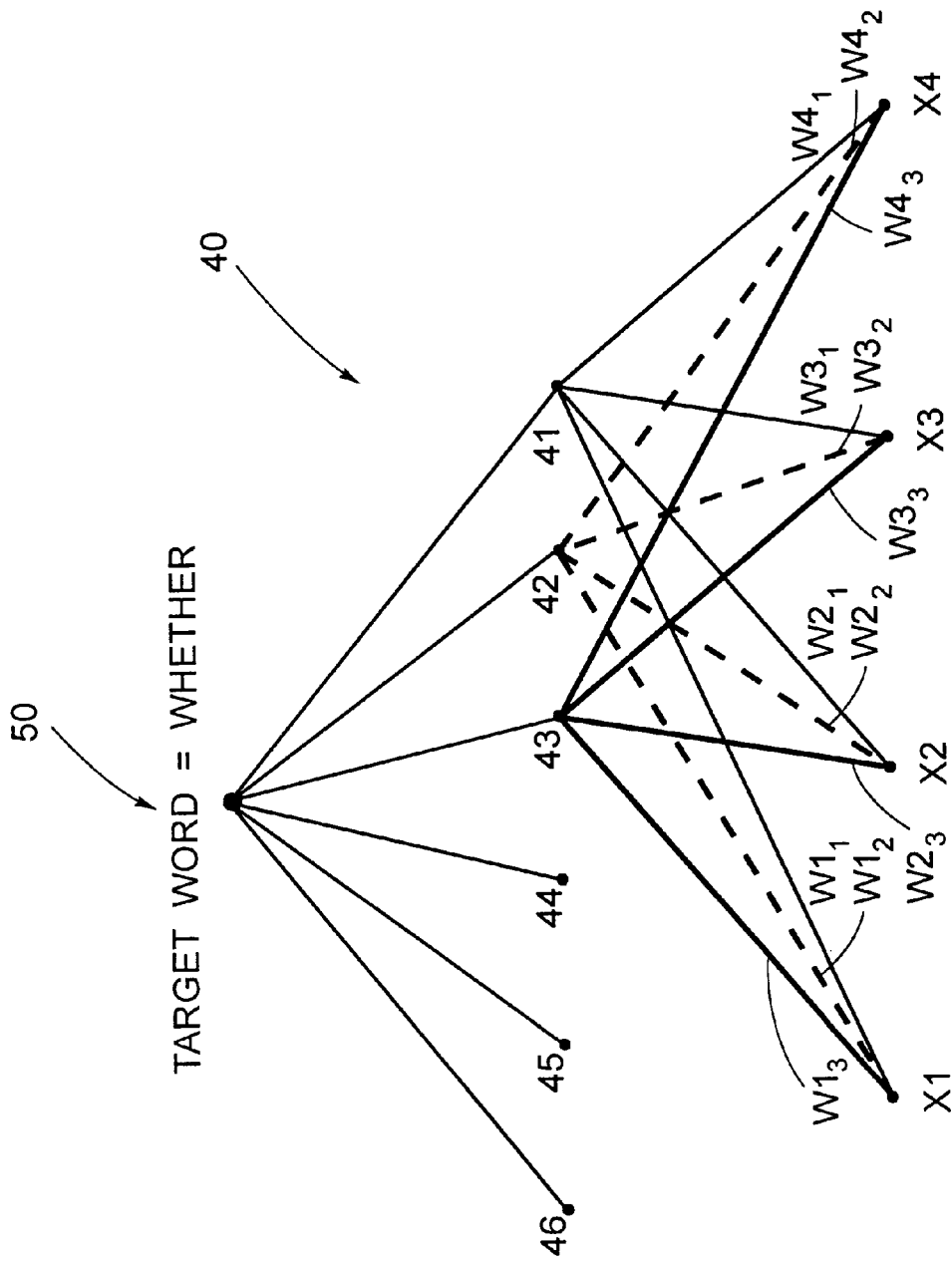
FIG. 4 is a schematic representation of an entry in a database according to a another embodiment of the invention.

For a better understanding of the latter description, attention is directed to FIG. 4. The entry WHETHER of FIG. 2 is depicted as a "cloud" of members 40 consisting of members 41–46 of which, for clarity only nodes 41–43 are shown in their entirety. Each one of the cloud members 41–46 is effectively identical to that depicted in FIG. 2, except for the fact that each member is associated with a unique demotion and/or promotion factor. Insofar as demotion factor is concerned, the larger is the demotion parameter the stricter is the node, i.e. the weights are penalized more severely for mistaken prediction (mistaken prediction occurs when negative example is mistakenly estimated to be a positive one. Put differently, for negative example:

$$\sum_{i=0}^{i=n} x_i \cdot w_i > \theta.$$

As specified, all the members within a given cloud (i.e. experts) execute Winnow independently (and normally simultaneously) on the same input and due to the distinct demotion and/or promotion parameters, different weight sets are produced. Thus, nodes 41–43 are associated with respective set of weights:

{$W_1(1),W_2(1),W_3(1),W_6(1),W_{1760}(1),W_{40,000}(1)$},

{$W_1(2),W_2(2),W_3(2),W_4(2),W_6(2),W_{1760}(2),W_{40,000}(2)$} and

{$W_1(3),W_2(3),W_3(3),W_4(3),W_6(3),W_{1760}(3),W_{40,000}(3)$}, (of which there are shown, for clarity, only those that correspond to $X_1$, $X_2$, $X_3$ and $X_4$).

The combination of the various experts may be effected in various techniques. According to one embodiment the so called weighted majority techniques utilized. According to one variant of the weighted a average technique each expert is assigned in a weight of the form $\gamma^m$, where $0<\gamma<1$ is a constant and m is the total number of mistakes incurred by the expert so far. The essential property is that the weight of experts making many mistakes rapidly disappears.

As shown in FIG. 4, the ultimate decision of the WHETHER node 50 is composed of weighted majority of the local experts 41–46, i.e.

$$T(\text{target word}) = \sum_{j=0}^{j=n} c_j \cdot \gamma_j,$$

wherein $C_j$ being the prediction of an expert #j (from among the k experts in the cloud) such that $$C_j = \sum_{i=0}^{i=n} x_i \cdot w_i$$

as previously defined, and $\gamma_j$, being the weight of the member expert in the overall decision of the value of the target word (referred to as T(target word)). Put differently, T(target word) is calculated by summing the weighted results of the distinct cloud members that pertains to this confusion set's member.

As specified before, according to one embodiment the correct target word from among the members of the confusion set is taken to be the one having the largest T(target word) value.

In this example $\gamma$ is in the form of $\gamma^m$, wherein m is a counter which counts the number of mistakes occurred by the expert so far (i.e. for positive example predicting negative result and/or for negative example predicting positive result), and $0<\gamma<1$).

For a better understanding of the foregoing, attention is again directed to example (2) to wit:

(2) "I don't know WHETHER it's sunny today", wherein the target word is WHETHER.

The active features are, as recalled:
1) words (for k=2): $X_1$=don't; $X_{12}$ =know; $X_7$=it's; $X_5$=sunny;
2) part of speech elements: $X_9$=know ____; $X_2$=Verb ____; the active features are, thus: 1, 2, 5, 7, 9, and 12 and the associated weights (hereinafter first set of weights) are 0.1, 0.7, 0.02, 0.03, 0.005, 0.01, respectively (before applying the promotion factor).

Assuming, for example, that the concept WHETHER is represented as a cloud of two members both of which are linked to the same list of features i.e. 1, 2, 3, 4, 5, 6, 7, 9, 11, 12, 17, 25, 37, 56 and 106 as specified above. Whilst both members in the cloud are related to the same list of features, they are nevertheless distinguished by their promotion and/or demotion factors which result in discerned set of weights that are associated with the features. Suppose that the set of weights that are associated with the active features 1, 2, 5, 7, 9, and 12 with respect to the second member in the cloud is 0.1, 3.2, 0.02, 0.5, 0.03 and 0.07. As recalled applying Winnow to the first member (which is considered as a positive example) resulted in total score of 0.91 which necessitated applying the promotion factor since the score didn't exceeded the threshold level 1.

Applying Winnow to the set of weights associated with the active features with respect to the second member results in a total score 0.1+3.2+0.02+0.5+0.03+0.07=3.92 which obviously surpasses the threshold. Since sentence (2) is deemed a positive example no update in the weights is required.

The above example illustrates typical training phase step during which the weights are updated, if necessary, in order to duly reflect the contextual relationship between the features and the pertinent target word.

During operational phase the "weight update" step is normally skipped, and the goal is to determine whether words are correctly used in a text, e.g. by invoking built-in context text checker incorporated within a conventional word processor. To this end the database is accessed for ascertaining whether a suspect word e.g. the word WHETHER in sentence (2) is correctly used. Thus, the score of each expert (member in the cloud or $C_i$ in the above description) is calculated and this, as specified, results in 0.91 and 3.92. Now, the overall score of WHETHER (T(target word)) is calculated by summing the weighted results of the distinct cloud members that pertains to this confusion set's member.

Suppose that the first member in the cloud is associated with a weight value $\gamma_1$=0.75 and the second member in the cloud is associated with a weight value $\gamma_1$=0.25, than the overall grading of the correctness of the concept WHETHER is 0.75*0.91+0.25*3.92=1.7. Incidently, focusing for a moment again on the training phase, it is recalled that the first member failed in predicting the use of the word WHETHER (i.e. score of "0.91" which was less than the required threshold "1"). This normally results in incrementing (m) which counts the number of failures of this particular member and consequently the value of the weight ($\gamma_1$) associated with this member is decreased (intuitively, it is punished due to the wrong prediction).

Reverting now to the operational phase, if the overall grading of the word WHETHER is the highest, (as compared to that of the remaining members in the confusion set) is indicated to be the most likely to be the correct word. By this particular example, the target word in the text was found to be the correct one and therefore there is no necessity to prompt the user. In the case of discrepancy, i.e. when the target word in the target text is not in agreement with that predicted by the text checker the user is preferably prompted for amending the word and if possible substitute words are presented e.g. words in a confusion set having overall grading which surpasses that of the target word.

Those versed in the art will no doubt appreciate that various modifications the above embodiments are feasible.

Thus, by way of example, the conventional Winnow algorithm may be modified to drop from the database representations of poorly performing features, e.g. whose weight value drops below a given threshold, or whose weight values drop to a low value relative to the highest weight of a mating feature linked to the same target word.

By another embodiment, features which are observed to appear, within various training corpus texts, always together with other features (e.g. $X_1$ and $X_3$) with respect to the same target word, are merged into a common feature ( $X_{1,3}$) having, of course, one weight value, whereby a more efficient database representation is obtained.

Applying the Winnow algorithm or variants thereof and utilizing the weighted majority algorithm in the manner specified, are only examples, and other variants thereof are also embraced by the present invention, all depending upon the particular application.

Those versed in the art will readily understand that the invention is not limited to these techniques. Thus, by way of non limiting example a simple majority algorithm may be applied instead of the weighted majority, e.g. for a cloud of a given target word that includes 9 member, if 5 members in the cloud predict a value that exceeds 0 and 4 members predict a value that is less than 0 than the overall indication is that the usage of the target word in the text is likely to be correct.

It should be further emphasized that the extension of the basic embodiment of the kind depicted in FIG. 2 (which may be viewed as one level prediction approach), to the "cloud" embodiment of the kind depicted in FIG. 4 (which may be viewed as a two-level prediction approach) is only one possible form of extension. Other forms of two level prediction are also embraced by the present invention. Likewise, the invention is not limited to only two level prediction and accordingly higher level prediction or other criteria may be utilized, all as required and appropriate.

There follows a description of experimental results of a method for evaluating whether a target word in a text is a correct word according to one embodiment of the invention utilizing a variant of Winnow vs. a counterpart method the utilizes Bayes. Since Bayes inherently allows to view each example in the training text corpus only once, a similar constraint was posed on the method of the invention. Accordingly the performance of the technique of the invention will, no doubt, improve if the latter constraint is removed.

To understand the performance of WinnowS on the task of context-sensitive spelling correction, we start by comparing it with Bayes using the pruned set of features that Bayes normally uses. This evaluates WinnowS purely as a method of combining evidence from multiple features. An important claimed strength of the Winnow-based approach, however, is the ability to handle large numbers of features. We tested this by (essentially) disabling pruning, and seeing how WinnowS and Bayes scale up.

The preceding experiments drew the training and test sets from the same population, following the traditional PAC-learning assumption. Thus assumption may be unrealistic for he task at hand, however, where a system may encounter a target document quite unlike those seen during training. To check whether this was in fact a problem, we tested the across-corpus performance of the methods. We found it was indeed not noticeably worse than within-corpus performance. The sections below present these experiments, interleaved with discussion.

Pruned versus Unpruned

This first step of the evaluation was to test WinnowS under the same conditions that Bayes normally runs under—i.e., using Bayes' usual pruned set of features. We used a random 80-20 split (by sentence) of the 1-million-word Brown corpus [H. Kucera and W. N. Francis. *Computational Analysis of Present-Day American English*. Brown University Press, Providence, R.I., 1967.] for the training and test sets. Bayes was trained first, to learn its pruned set of features; each algorithm was then tested, using this set of features, on 21 confusion sets taken from the list of "Words Commonly Confused" in the back of the Random House dictionary [S. B. Flexner, editor. *Random House Unabridged Dictionary*. Random House, New York, 1983. Second Edition.]. The results appear in the 'Pruned' columns of Table 1. Although for a few confusion sets, one algorithm of the other does better, overall WinnowS performs comparably to Bayes.

The preceding comparison shows that WinnowS is a credible method for this task; but it does not test the claimed strength of Winnow—the ability to deal with large numbers of features. To test this, we modified Bayes to do only minimal pruning of features: features were pruned only if they occurred exactly once in the training set (such features are both extremely unlikely to afford good generalizations, and extremely numerous). The hope is that be considering the full set of features, we will pick up many "minor cases"—what Holte et al. [R. C. Holte, L. E. Acker, and B. W. Porter. Concept learning and the problem of small disjuncts. In *Proceedings of IJCAI-89*, Detroit, 1989.] have called "small disjuncts"—that are normally filtered out by the pruning process. The results are shows in the "Unpruned" columns of Table 1. It can be seen that WinnowS almost always improves, sometimes markedly, going from the pruned to the unpruned condition; moreover, it outperforms Bayes for every confusion set except one, where it ties. The results below will all focus on the behavior of the algorithms in the unpruned case.

Degradation for Unfamiliar Test Sets

The preceding experiment assumed that the training set will be representative of the test set. For context-sensitive spelling correction, however, this assumption may be overly strong; this is because word usage patterns vary widely from one author to another, or even one document to another. For instance, an algorithm may have been trained on one corpus to discriminate between desert and desert, but when tested on an article about the Persian Gulf War, will be unable to detect the misspelling of desert in Operation Desert Storm. To check whether this is in fact a problem, we tested the across-corpus performance of the algorithms: we again trained on 80% of Brown, but tested on a randomly-chosen 40% of the sentences of WSJ, a ¾-million-word corpus of articles from The Wall Street Journal [M. P. Marcus, B. Santorini, and M. Marcinkiewicz. Building a large annotated corpus of English: The Penn Treebank. *Computation Linguistics*, 19(2):313–330, June 1993.] The algorithms were run in the unpruned condition. The results appear in Table 2. It can be seen that both algorithms degraded on most confusion sets to varying degrees.

TABLE 1

| Confusion set | Test cases | Pruned | | | Unpruned | | |
|---|---|---|---|---|---|---|---|
| | | Features | Bayes | WinnowS | Features | Bayes | WinnowS |
| accept, except | 50 | 78 | 88.0 | 87.8 | 849 | 92.0 | 92.0 |
| affect, effect | 49 | 36 | 98.0 | 100.0 | 842 | 98.0 | 100.0 |
| among, between | 186 | 145 | 75.3 | 75.8 | 2706 | 78.5 | 84.4 |
| amount, number | 123 | 68 | 74.8 | 73.2 | 1618 | 80.5 | 86.2 |
| begin, being | 146 | 84 | 95.2 | 89.7 | 2219 | 94.5 | 95.9 |
| cite, sight, site | 34 | 24 | 76.5 | 64.7 | 585 | 73.5 | 82.4 |
| country, county | 62 | 40 | 88.7 | 90.0 | 1213 | 91.9 | 96.8 |
| its, it's | 366 | 180 | 94.5 | 96.4 | 4679 | 95.9 | 99.2 |
| lead, led | 49 | 33 | 89.8 | 87.5 | 833 | 85.7 | 93.9 |
| fewer, less | 75 | 6 | 96.0 | 94.4 | 1613 | 92.0 | 93.3 |
| maybe, may be | 96 | 86 | 90.6 | 84.4 | 1639 | 95.8 | 97.9 |
| I, me | 1225 | 1161 | 97.8 | 98.2 | 11625 | 98.3 | 99.5 |
| passed, past | 74 | 141 | 89.2 | 90.5 | 1279 | 90.5 | 95.9 |
| peace, piece | 50 | 67 | 74.0 | 72.0 | 992 | 92.0 | 94.0 |
| principal, principle | 34 | 38 | 85.3 | 84.8 | 669 | 85.3 | 94.1 |
| quiet, quite | 66 | 41 | 95.5 | 95.4 | 1200 | 89.4 | 90.9 |
| raise, rise | 39 | 24 | 79.5 | 74.3 | 621 | 84.6 | 89.7 |
| than, then | 514 | 857 | 93.6 | 96.9 | 6813 | 93.4 | 97.9 |
| their, there, they're | 850 | 946 | 94.9 | 96.6 | 9449 | 94.6 | 98.4 |
| weather, whether | 61 | 61 | 93.4 | 98.4 | 1226 | 98.5 | 100.0 |
| your, you're | 187 | 103 | 90.4 | 93.6 | 2738 | 90.9 | 99.5 |

Pruned versus unpruned performance of Bayes and WinnowS. In the pruned condition, the algorithms use Bayes' usual pruned set of features; in the unpruned condition, they use the full set. The algorithms were trained on 80% of Brown and tested on the other 20%. The "Features" columns give the number of features used.

TABLE 2

| Confusion set | Test cases Within | Test Cases Across | Bayes Within | Bayes Across | WinnowS Within | WinnowS Across |
|---|---|---|---|---|---|---|
| accept, except | 50 | 30 | 92.0 | 80.0 | 92.0 | 86.7 |
| affect, effect | 49 | 66 | 98.0 | 84.8 | 100.0 | 93.9 |
| among, between | 186 | 256 | 78.5 | 78.5 | 84.4 | 78.1 |
| amount, number | 123 | 167 | 80.5 | 68.9 | 86.2 | 76.6 |
| begin, being | 146 | 174 | 94.5 | 89.1 | 95.5 | 90.8 |
| cite, sight, site | 34 | 18 | 73.5 | 50.0 | 82.4 | 33.3 |
| country, county | 62 | 71 | 91.9 | 94.4 | 96.8 | 100.0 |
| its, it's | 366 | 1277 | 95.9 | 95.5 | 90.2 | 98.6 |
| lead, led | 49 | 69 | 85.7 | 79.7 | 93.9 | 92.8 |
| fewer, less | 75 | 148 | 90.5 | 95.9 | 95.9 | 98.0 |
| maybe, may be | 96 | 67 | 95.8 | 92.5 | 97.9 | 89.6 |
| I, me | 1225 | 328 | 98.3 | 97.9 | 99.5 | 98.5 |
| passed, past | 74 | 148 | 90.5 | 95.9 | 95.9 | 98.0 |
| peace, piece | 50 | 19 | 92.0 | 78.9 | 94.0 | 89.5 |
| principal, principle | 34 | 30 | 85.3 | 70.0 | 94.1 | 86.7 |
| quiet, quite | 66 | 20 | 89.4 | 60.0 | 90.9 | 75.0 |
| raise, rise | 39 | 118 | 84.6 | 71.2 | 89.7 | 79.7 |
| than, then | 514 | 637 | 93.4 | 96.5 | 97.9 | 98.1 |
| their, there, they're | 850 | 748 | 94.6 | 91.6 | 98.4 | 98.5 |
| weather, whether | 61 | 95 | 98.4 | 94.7 | 100.0 | 96.8 |
| your, you're | 187 | 74 | 90.9 | 85.1 | 99.5 | 97.3 |

Across-corpus versus within-corpus performance of Bayes and WinnowS. Training was on 80% of Brown in both cases. Testing for the within-corpus case was 20% of Brown; for the across-corpus case, it was on 40% of WSJ. The algorithms were run in the unpruned condition.

In the claim which follow, alphabetic characters used to designate claim steps are provided for convenience of description only, and do not necessarily imply any particular order of performing the steps.

The present invention has been described with a certain degree of particularity but it should be understood that various modifications and alteration may be made without departing from the scope or spirit of the invention as defined by the following claims:

I claim:

1. A database which stores information for allowing a computer program to evaluate the usage of a target word within the context of surrounding words in a target text, the database comprising:

a computer-readable medium;

a database structure stored on the computer-readable medium, the database structure including:

a plurality of target words, each one of said target words including at least two members so as to constitute a target word cloud that represents said target word; and a plurality of features and associated weight values stored with respect to each of said at least two members, the plurality of features reside in the vicinity of said one target word within the target text and are essentially common to all of said members;

wherein the plurality of weight values indicate a contextual relationship at least between the target word and the plurality of features.

2. The database according to claims 1, wherein said plurality of features include word features within ±k words of the target word in said training text corpus.

3. The database according to claim 1, wherein said features include collocation features, each constituting a pattern of up to l items that reside the vicinity of said target word in said training text corpus.

4. The database according to claim 1, for use in a context related text checking application, wherein said plurality of target words include a plurality of confusion sets each of which including at least two words.

5. The database of claim 4, wherein each confusion set include at least two words having similar pronunciation but different spelling.

6. The database according to claim 1, wherein each one of said target words having either or both of promotion and demotion factor, for altering at least some of the weight values of active features, from among said plurality of features; the active features being encountered in the vicinity of a candidate word within a text.

7. The database according to claim 6, wherein said candidate word and said target word belong to the same confusion set.

8. The database according to claim 6, wherein all of said target words having the same demotion factor.

9. The database according to claim 6, wherein all of said target words having the same promotion factor.

10. The database according to claim 1, wherein each member, from among said at least two members in a cloud, being associated with a unique promotion factor vis-a-vis the promotion factors of the remaining members from among said at least two instances.

11. The database according to claim 1, wherein each member, from among said at least two members in a cloud, being associated with a unique demotion factor vis-a-vis the demotion factors of the remaining members from among said at least two members.

12. The database according to claim 1, wherein each one of the target word members in a cloud is associated with a second weight value indicating the weight of said target word member in the overall representation of said target word.

13. A method for determining whether a target word used in a text is a correct word, the method being carried out in a data processor and utilizing a database structure, the data processor being configured according to a given operating system for reading data from, writing data to a storage medium and presenting data on a display screen, the data structure including:

(i) a plurality of target words;

(ii) each one of said target words has at least two members so as to constitute a target word cloud that represents said target word, a plurality of features and associated weight values stored with respect to each of said at least two members, the plurality of features reside in the vicinity of said one target word within the target text, and are essentially common to all of said members, wherein the plurality of weight values indicated a contextual relationship at least between the target word and the plurality of features;

the method comprising:

(a) identifying at least one feature residing in the vicinity of said target word in a text, said target word being in the database stored on said storage medium;

(b) using the at least one feature identified in step (a) to retrieve information from the database by application of the at least two members in the target word cloud, the information being indicative as to the likelihood of said target word being in context with the at least one feature; and (c) evaluating the information retrieved in step (b) to determine whether the target word is likely to be either the correct word or if it should be replaced within said text.

14. The method according to claim 13, wherein the target word belongs to a confusion set that includes at least one additional candidate word; and wherein the information stipulated in step (b) being indicative also as to the likelihood of at least one of said candidate words being in context with the at least one feature; and wherein said step (c) is replaced by the following step (c')

(c') using the information retrieved in step (b) as a criterion for determining whether the target word should be either replaced within said text or replaced within said text by one of said candidate words.

15. The method according to claim 13, wherein the information stipulated in step (b) include at least one weight value associated with the at least one feature, respectively;

the plurality of weight values indicating a contextual relationship at least between the target word and the plurality of features.

16. The method according to claim 13, wherein the criterion for indicating whether the target word is the correct word as stipulated in said step (c), being:

$$\sum_{i=0}^{i=n} x_i \cdot w_i > \theta$$

$w_i$ being said at least one weight value, $x_i$ being said at least one feature, and $\theta$ being a predetermined threshold.

17. The method according to claim 13, wherein said database is defined in claim 1.

18. The method of claim 14, wherein step (c') comprises presenting user with a list of candidate words on said display screen and allowing the user to at least select between the target and the candidate words.

19. A training method for determining whether a target word used in a training corpus text is a correct word, the method being carried out in a data processor and utilizing a database structure on a storage medium, the data processor being configured according to a given operating system for reading data from, writing data to the storage medium and presenting data on a display screen, the data structure including:

(i) a plurality of target words;

(ii) each one of said target words has at least two members so as to constitute a target word cloud that represents said target word, a plurality of features and associated weight values stored with respect to each of said at least two members, the plurality of features reside in the vicinity of said one target word within the target text, and are essentially common to all of said members, wherein the plurality of weight values indicated a contextual relationship at least between the target word and the plurality of features;

the method comprising:

(a) identifying at east one feature residing in the vicinity of said target word in a text, said target word being in the data structure stored on said storage medium;

(b) using the at least one feature identified in step (a) to acquire information from the database by application of the at least two members in the target word cloud, the information being indicative as to the likelihood of said target word being in context with the at least one feature; and (c) using the information retrieved in step (b) as a criterion for predicting whether the target word is likely to be either the correct word or an incorrect word that should be replaced within said text and in the latter case, altering the information in said data structure.

20. The method according to claim 19, wherein altering said information is effected by utilizing Winnow based technique.

21. The method of claim 20, wherein the Winnow technique is modified to drop from the database representations of features whose weight value drops below a given threshold.

22. The method of claim 20, wherein features which are observed to appear, within various training corpus texts, always together with other features with respect to the same target word, are merged into a common feature having one weight value.

23. The method according to claim 19, wherein said database is defined in claim 1.

24. A processor being configured according to a given operating system for reading data from, writing data to a storage medium and displaying data on a display screen; the processor comprising means configured to access a database stored on said storage medium for performing context related text checking, the database being defined in claim 1.

* * * * *